United States Patent Office 2,953,530
Patented Sept. 20, 1960

2,953,530

METHOD AND COMPOSITIONS FOR DETECTING FLAWS

Robert C. Switzer, Shaker Heights, Ohio, assignor to Switzer Brothers, Inc., Cleveland, Ohio, a corporation of Ohio No Drawing. Filed Dec. 14, 1955, Ser. No. 553,166

28 Claims. (Cl. 252—301.2)

This invention relates to improved compositions for use in locating in test bodies surface discontinuities and subsurface flaws having surface openings. More particularly, the invention relates to improved compositions for use in the non-destructive testing of test bodies, e.g., in accordance with my United States Patent No. 2,405,078, granted October 14, 1941. According to said patent, a water-insoluble, water-emulsifiable, flaw-penetrating, oily liquid containing a dissolved fluoragent may be employed as a testing agent by applying it to the article by dipping, spraying, or the like, and thereafter removing it from the surfaces thereof, except for the portion which has penetrated the flaws. Thereby, when the article is inspected under fluorescigenous radiation, the testing agent containing the fluoragent which remained in any flaws appears to reappear in or at the surface opening of the flaw by fluorescing so as to render detectable the location of the flaw and, often, the type of flaw. Detection is usually visual, although in some cases it may be made by light-sensitive instruments, such as photographic or photoelectric devices and the like.

The invention also relates to improved penetrant compositions containing a dissolved, non-fluorescent dye or the like which imparts to the penetrant any suitable color, visible in ordinary light, when used in accordance with processes disclosed in my copending Patent No. 2,839,918 granted June 24, 1958, or my copending joint application with Richard A. Ward, Serial No. 484,319, filed January 26, 1955.

This invention has for its object to provide testing agents, for use in such testing procedures, which have various improved characteristics, regardless of whether the testing agents contain a fluoragent, or a non-fluorescent dye or the like, or both dissolved therein to provide the desired color contrast. Among the improved characteristics sought and achieved by the invention are:

(1) Easier removability of the testing agent from the surface of the test body, without removing it from subsurface flaws;

(2) Enhanced sensitivity of the testing agent for detecting fine cracks as a result of increased brightness of fluorescence of a dissolved fluoragent of a given concentration and possibly also as a result of better penetration of fine cracks;

(3) Increased solvent power of the testing agents for numerous dyes, whereby greater brightness of fluorescent and/or non-fluorescent color indications is obtainable;

(4) Reduced sensitivity of water-insoluble testing agents to variations in water content, which have heretofore tended to adversely affect the emulsification of such compositions and the tendencies toward phase separation and scum formation during removal of the compositions from the surfaces of test bodies.

Heretofore, testing agents for use as described above have generally comprised light hydrocarbon fractions, such as kerosene or the like, as water-insoluble, water-emulsifiable, oily liquid penetrants, and a fluoragent or other dye dissolved therein. Commonly, a coupling agent has been added to facilitate solvation of the dye.

The present invention involves the discovery that the several improved characteristics enumerated above may be imparted to testing agents for the purposes described by adding to or by substituting in whole or in part for the hydrocarbon oil penetrant one or more members of the class of polyoxyalkylene glycols and various ether derivatives thereof. The polyoxyalkylene glycols may be represented by the general formula:

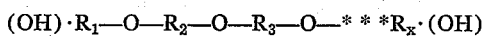

in which $R_1$, $R_2$, $R_3$, * * * $R_x$ are aliphatic groups and may all be the same group or may be different groups in various combinations. There are no clearly ascertainable or critical upper or lower limits to the total number, $x$, of such groups, and this number may, and generally will, vary from molecule to molecule in a given composition. In general, a mixture of such compounds should have an average molecular weight such that the part attributable to the oxyalkylene chain is of the order of about 200 to about 1,000 or more, though these figures in no sense represent operative limits, and suitable average molecular weights may in some instances be either lower or higher than this general range, depending on many formulation considerations. For maximum water-solubility, at least the major proportion of the radicals $R_1$, $R_2$, $R_3$, etc., should be ethylene groups and most or all of the remainder no higher in the aliphatic radical series than propylene, though the presence of, say, one butylene group or even one dodecene group in an average chain length of, say, ten alkylene groups is relatively inconsequential as regards water-solubility. In general, more than ten or twelve carbon atoms in any one alkylene radical is not desirable.

The ether derivatives of the above described polyoxyalkylene glycols may be either aliphatic monoethers or aliphatic diethers, respectively represented by the formulae:

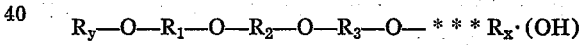

and

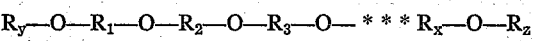

in which $R_y$ and $R_z$ are aliphatic groups having from one to about ten or twelve carbon atoms.

These glycols and their ether derivatives include, for example, the various compositions described and claimed in U.S. Patents 2,425,755; 2,425,845; 2,448,664; and 2,520,611. They are oily liquids which vary from high water-solubility to high water-insolubility and have viscosities extending over a wide range. The glycols described and claimed in said patents and aliphatic mono and diethers thereof have average molecular weights of about 300 or higher attributable to oxy 1,2-propylene groups or a combination of oxyethylene and oxy 1,2-propylene groups, exclusive of etherifying groups in the cases of the mono and diethers. They are quite inert to the most generally used structural metals, including iron, steel, copper, brass, bronze, aluminum, and bearing alloys, and non-metallic materials such as plastics, ceramics, and the like, of which the article or body to be tested may be composed. Both the water-soluble and water-insoluble forms, of widely varying viscosities, may be used in accordance with the present invention, though the water-insoluble forms are presently preferred. The most suitable ranges of viscosities depend upon various formulation considerations discussed below.

When it is desired that water-insoluble testing agents of the class described be "self-emulsifiable," as distinguished from being merely "emulsifiable," so that they may be washed from the surface of a test body with plain water (containing no emulsifying agent or other additive), the testing agent may include (in accordance with U. S. Patent No. 2,405,078 of Richard A. Ward) an oil-soluble emulsifying agent, such as a petroleum sulfonate, an alkali metal soap of mahogany acid, a naphthenic acid soap, or the like, or any of a wide variety of soaps, detergents, or other surface-active agents. Alternatively, the emulsifying agent may be rendered a more effective emulsifier, more soluble in the testing agent, and more tolerant of water dilution of the testing agent, by including a mutual solvent or coupling agent for the emulsifying agent and oily penetrant (as also disclosed in said Patent No. 2,405,078). In this case, the mutual solvent or coupling agent may be viewed as a part of the emulsifying agent.

When no emulsifying agent is included in a water-immiscible testing agent prior to its application to the test body, its subsequent removal from the surfaces of the test body may be effected in either of two ways with excellent results. One way is to incorporate an emulsifying agent in the wash water (also disclosed in said Patent No. 2,405,078). The other is to apply a suitable emulsifying composition over the film of testing agent by a second dipping or spraying operation before washing the penetrant composition from the surfaces of the test body (as disclosed in copending Patent No. 2,806,959 of Taber de Forest and Donald W. Parker, granted September 17, 1957). In this case, the washing operation is timed to follow the separate application of the emulsifying agent after the latter has dispersed substantially through the previously applied film of the testing agent, but before it has dispersed to any appreciable extent into any subsurface flaws of the test body.

In accordance with the present invention, as heretofore indicated, the testing agent may be either water-miscible or water-immiscible. In the former case, and if the degree of water-miscibility is high, no emulsifying agent is necessary, and in the latter case, or with only a moderate degree of water-miscibility, the emulsifying agent may or may not be included in the testing agent, depending upon the procedure to be followed. An emulsifying agent, therefore, is not necessarily an essential component of the compositions of the present invention, though it may be included therein.

In its broadest aspect, the present invention involves the use of one or a mixture of the above described polyoxyalkylene compounds as the basic dye-carrying penetrant, with or without another liquid as a dilutent. If a mixture of polyoxyalkylene compounds with one or more dyes dissolved therein constitutes the testing agent, with no dilutent, the composition may require thinning with heat to reduce the viscosity to a point where optimum penetration is achieved. In this case, the dye concentration in the liquid penetrant may be any concentration which is soluble in the particular polyoxyalkylene composition employed and which will give a sufficiently strong color indication in use.

If one or a mixture of the polyoxyalkylene compositions is to be used with a dilutent, the viscosity and amount of the dilutent may be balanced to produce the desired working viscosity. In this case, the addition of the dilutent obviously reduces the initial dye concentration in the polyoxyalkylene composition before such dilution, and correspondingly higher initial dye concentrations should be employed to obtain comparable color brightness. One of the particular advantages of the present invention is the high solubility of both fluorescent and non-fluorescent dyes in the polyoxyalkylene compounds, whereby all the required dye in the final composition may be incorporated in a polyoxyalkylene dye carrier for subsequent dilution with a suitable dilutent.

When a dilutent is to be employed, as presently preferred in the interest of economy, it should be one which is completely compatible with the polyoxyalkylene-dye solution and should generally have a viscosity-lowering effect when added to the solution, since the majority of the commercially available polyoxyalkylene mixtures require more or less reduction in viscosity before use as penetrants for the purposes of this invention. The dilutent may be either volatile or non-volatile. When used to dilute a water-immiscible, dyed, polyoxyalkylene composition, the dilutent is also preferably water-immiscible so as to give more satisfactory emulsifying characteristics to the diluted mixture. When used to dilute a water-soluble, dyed, polyoxyalkylene composition, the dilutent may be water-miscible or water-immiscible, depending upon whether or not the water-soluble polyoxyalkylene composition is also relatively highly oil soluble, as many of them are. However, it is preferable to use a water-soluble dilutent with a water-soluble polyoxyalkylene composition, and water itself may be employed for this purpose.

In general, the proportions of the ingredients of the final testing agents in an emulsifiable system are subject to the same variations and are formulated in view of the same considerations disclosed in my United States Patent No. 2,259,400, considering the polyoxyalkylene composition and any dilutent employed as constituting the penetrant component. Thus, the total penetrant may comprise from approximately fifty to about ninety-seven percent of the testing agent by weight; the concentration of emulsifying agent and coupling agent, if any, may vary from approximately three to fifty percent by weight; and the concentration of fluoragent or other dye or dyes may vary from approximately one-tenth of one percent, or even less, to several percent by weight, according to the character, the fluorescent or color strength, and the solubility of the dye or dyes in the penetrant composition. In the case of a fluoragent, less than one percent is generally sufficient and as little as 0.1% is often quite satisfactory. However, the dye concentrations previously employed have often been limited by the solubility of the dyes in the penetrant, and the present invention permits the use of higher dye concentrations with resultant improved color indications in use.

When using water-soluble polyoxyalkylene compositions as the dye carrier, the testing agents of the invention may consist entirely of the polyoxyalkylene composition and one or more dyes dissolved therein in any concentration from about 0.1%, or even less, up to their limits of solubility, depending upon the particular dye or dyes selected and the intensity of color indications desired. The addition of a small amount of a coupling agent for the dye carrier and water may be advantageous in some instances, depending upon the degree of water-solubility of the dye carrier, but, for the more highly water-soluble polyoxyalkylene compositions, this is unnecessary.

In accordance with pending United States application Serial No. 535,733 of Donald W. Parker and Joseph L. Switzer, filed September 21, 1955, now U.S. Patent No. 2,920,203 a plurality of dyes may be incorporated in a penetrant vehicle, one of the dyes being fluorescent with an emission peak in a particular, desired wave band and an absorption valley in a different wave band, and at least one other dye being fluorescent with an emission peak in the same wave band as the absorption valley of the first dye and being either transparent or reflective in the emission range of the first dye and preferably absorptive in a different range than the first dye. The effect of such a combination of dyes, termed "cascading," is that the brightness of the emitted light of the first dye is greatly enhanced without noticeably altering the color of the total emission. Either emulsifiable, water-insoluble vehicles or water-soluble vehicles may be employed in such a system. In some instances, a mixture of two mutually soluble vehicles, either water-soluble or water-insoluble, may be required to dissolve the combination of dyes to be employed in a cascading relationship. Both the water-soluble and water-insoluble polyoxyalkylene compositions of the present invention, by reason of their unusual solvent power for many different dyes, offer many possibilities as outstanding vehicles for use in such cascading systems.

In actual practice, a condition likely to be encountered when using testing agents of this general class is that water may become added to the testing agent before use, as by accidental splashing of water into the testing agent, or because some of the ingredients (especially emulsifying agents) may be deliquescent, or otherwise. Such water was regarded heretofore as an adulterant in the commonly used, water-insoluble, penetrant compositions, and very small proportions could cause phase separation and scum formation sufficient to destroy the utility of such testing agents. It has been discovered that the presence of the polyoxyalkylene compounds in water-insoluble testing agents made according to this invention increases the tolerance of these testing agents to relatively small amounts of water which may be accidentally introduced or incorporated as part of an emulsifying agent, coupling agent, or the like. When using water-soluble testing agents made in accordance with this invention, obviously, the former difficulties from accidental water dilution are completely eliminated.

The use of polyoxyalkylene compositions in accordance with the invention also appears to enhance the brightness of fluorescence of a dissolved fluoragent so as to give greater brightness with a given concentration of the fluoragent or equal brightness with a lesser concentration thereof. It also makes the testing agents more easily removed from the surfaces of a test body without removing them from subsurface flaws therein. It also seems to facilitate the rapid and complete penetration of the testing agents into fine cracks in the surface of a test body, and generally improves the working qualities of the testing agents.

In the following illustrative examples of testing agent compositions made in accordance with the present invention, the polyoxyalkylene penetrants used were all commercially available mixtures of the kind noted in each individual example, sold under the trade-mark "UCON" by Carbide and Carbon Chemicals Division of Union Carbide and Carbon Corporation, New York, N.Y. In each example the manufacturer's designation for the particular composition is also given in parentheses, e.g. ("Ucon LB-65").

The following Examples 1, 2, 3, and 4 are illustrative of self-emulsifiable testing compositions embodying the invention and comprising a water-immiscible polyoxyalkylene penetrant and a water-immiscible organic extender or dilutent:

*Example 1*

Percent by weight
(1) Kerosene _____ 70.00
(2) Water - immiscible, polymerized, monohydroxy, 1,2-polyoxypropylene aliphatic monoethers having a viscosity of about 65 S.U.S. at 100° F. ("Ucon LB-65") _____ 10.00
(3) Medium molecular weight, sodium petroleum sulfonate (30-40% inert) _____ 15.84
(4) Di-ethylene glycol _____ 4.00
(5) Fluoragent (equal parts of 2-n-butyl amino, 1,8-naphthal-n-butylimide and 4-methyl, 7 diethyl amino coumarin) _____ 0.16

*Example 2*

(1) Kerosene _____ 70.00
(2) Water - immiscible, polymerized, monohydroxy 1,2-polyoxy propylene aliphatic monoethers having a viscosity of about 385 S.U.S. at 100° F. ("Ucon LB-385") _____ 10.00
(3) Medium molecular weight, sodium petroleum sulfonate (30-40% inert) _____ 15.84
(4) Diethylene glycol _____ 4.00
(5) Fluoragent (same as Example 1) _____ 0.16

*Example 3*

(1) Kerosene _____ 75.00
(2) Polyoxyalkylene composition of Example 1— ("Ucon LB-65") _____ 5.00
(3) Medium molecular weight, sodium petroleum sulfonate (30-40% inert) _____ 15.84
(4) Diethylene glycol _____ 4.00
(5) Fluoragent (same as Example 1) _____ 0.16

*Example 4*

(1) Kerosene _____ 60.4
(2) Water-immiscible, polymerized monohydroxy 1,2-polyoxypropylene aliphatic monoethers having a viscosity of about 625 S.U.S. at 100° F. ("Ucon LB-625") _____ 22.2
(3) Medium molecular weight, sodium petroleum sulfonate (30-40% inert) _____ 12.2
(4) Diethylene glycol _____ 3.3
(5) Sulfonated castor oil _____ 1.2
(6) Fluorol 7 GA (dye) _____ 0.7

The compositions of Examples 1, 2, 3, and 4 all contain a fluorescent dye responsive to black light and a hydrocarbon extender or diluent for the polyoxyalkylene compound, and are suitable for use according to the procedure described in the above mentioned U.S. Patent No. 2,405,078 of Richard A. Ward.

The following Examples 5, 6, 7, 8, and 9 disclose compositions in which the polyoxyalkylene compound is miscible with water, and water is used as an extender or dilutent:

*Example 5*

Percent by weight
(1) Water _____ 20.1
(2) Water-miscible, polymerized, monohydroxy, oxyethylene oxy 1,2-propylene aliphatic monoethers having a viscosity of 55 S.U.S. at 100° F. ("Ucon 50 HB-55") _____ 79.5
(3) Rhodamine 6 GDN extra (dye) _____ 0.4

*Example 6*

(1) Water _____ 18.6
(2) Water miscible, polymerized, oxyethyleneoxy 1,2-propylene diols having a viscosity of 1400 S.U.S. at 100° F. ("Ucon 75 H-1400") _____ 81.0
(3) Rhodamine B extra (dye) _____ 0.4

*Example 7*

(1) Water _____ 42.8
(2) Polyoxyalkylene composition of Example 5 ("Ucon 50HB 55") _____ 56.6
(3) Brilliant sulpho flavine FFA (dye) _____ 0.6

*Example 8*

(1) Water _____ 41.6
(2) Water-miscible polyoxyalkylene composition of Example 5, but having a viscosity of 400 S.U.S. at 100° F. ("Ucon 50HB-4400") _____ 57.9
(3) Brilliant sulpho flavine FFA (dye) _____ 0.25
(4) 4-methyl, 7 diethyl amino coumarin (dye) __ 0.25

*Example 9*

(1) Water _____ 61.4
(2) Polyoxyalkylene composition of Example 6 ("Ucon 75-1400") _____ 38.4
(3) Sodium salt of fluorescein (dye) _____ 0.2

The dyes of Examples 5 and 6 are visually detectable under either ordinary light or black light. The dyes of Examples 7, 8, and 9 are suitable only detection under black light.

The composition of the following Example 10 contains a water-miscible polyoxyalkylene penetrant containing a dye suitable for detection only under black light, and is diluted with a water-miscible organic extender:

Example 10

| | Percent by weight |
|---|---|
| (1) Isopropanol | 76.1 |
| (2) Water-miscible polyoxyalkylene composition of Example 6, but having a viscosity of 90,000 S.U.S. at 100° F. ("Ucon 75H-90,000") | 23.4 |
| (3) Brilliant sulpho flavine FFA (dye) | 0.5 |

The compositions of the following Examples 11 and 12 contain water-immiscible polyoxyalkylene penetrants, but no emulsifying agent, and are suitable for use where an emulsifying agent is incorporated in the wash water or, alternatively, in accordance with copending application Serial No. 445,496 of Taber de Forest and Donald W. Parker, filed July 26, 1954:

Example 11

| | Percent by weight |
|---|---|
| (1) Kerosene | 62.8 |
| (2) Water-immiscible polyoxyalkylene composition of Example 4, but having a viscosity of 65 S.U.S. at 100° F. ("Ucon LB-65") | 37.1 |
| (3) Fluorol 7GA (dye) | 0.05 |
| (4) 4-methyl, 4-diethyl amino coumarin (dye) | 0.05 |

Example 12

| | |
|---|---|
| (1) Kerosene | 44.5 |
| (2) Water-immiscible polyoxyalkylene composition of Example 4, but having a viscosity of 625 S.U.S. at 100° F. ("Ucon LB-625") | 54.4 |
| (3) Oil soluble Medford Red Dye No. 322 | 1.1 |

The dye used in Example 11 is suitable only for detection under black light and the dye of Example 12 is a non-fluorescent dye suitable for detection under ordinary light.

The following examples disclose testing agents of both the self-emulsifying type and the non-self-emulsifying type, each being suitable for use by procedures referred to above with no dilutent or extender for the polyoxyalkylene penetrant.

Example 13

| | Percent by weight |
|---|---|
| (1) The water-immiscible polyoxyalkylene composition of Example 11 ("Ucon LG-65") | 99.5 |
| (2) Fluorol 7GA (dye) | 0.25 |
| (3) 4-methyl, 7 diethyl amino coumarin (dye) | 0.25 |

Example 14

| | |
|---|---|
| (1) The water-immiscible, polyoxyalkylene composition of Examples 1 to 4 but having a viscosity of 285 S.U.S. at 100° F. ("Ucon LB-285") | 75.7 |
| (2) Medium molecular weight, sodium petroleum sulfonate (30-40% inert) | 15.7 |
| (3) Diethylene glycol | 6.4 |
| (4) Sulfonated castor oil | 1.6 |
| (5) Oil soluble Medford Red Dye No. 322 | 0.6 |

Example 15

| | |
|---|---|
| (1) Water-immiscible alkyl diethers of polyoxy 1,2-propylene diols in which the alkyl ether groups have from 1 to 8 carbon atoms, the mixture having a viscosity of 62 S.U.S. at 100° F. ("Ucon DLB 62-E") | 76.1 |
| (2) Medium molecular weight, sodium petroleum sulfonate (30-40% inert) | 16.7 |
| (3) Diethylene glycol | 4.5 |
| (4) Sulfonated castor oil | 1.7 |
| (5) Fluorol 7 GA (dye) | 1.0 |

Example 16

| | |
|---|---|
| (1) Water-miscible polyoxyalkylene composition of Examples 5 and 7 ("Ucon 50HB-55") | 99.0 |
| (2) Sodium salt of fluorescein (dye) | 1.0 |

The composition of Example 13 is not self-emulsifying and contains fluorescent dyes suitable only for detection under black light. The compositions of Examples 14 and 15 are self-emulsifiable. The dye in Example 14 is non-fluorescent and suitable only for detection under ordinary light, whereas the dyes of Examples 13 and 15 are fluorescent. The composition of Example 16 is water-soluble and contains a fluorescent dye suitable only for detection under black light.

From the foregoing illustrative examples of the many useful variations of the present invention, it will be obvious to those skilled in the art that a great number of additional variations of those specific examples may be employed while obtaining the same or similar benefits from the use of polyoxyalkylene compositions as penetrants or as penetrant components in testing agents of the general character described. It will also be obvious that the many possible variants of the testing agents of the invention may be employed in still other manipulative procedures than those mentioned herein by way of illustration of the utility of such compositions. Accordingly, it will be appreciated that the invention is not limited to any of the particular embodiments disclosed, but may be extensively modified within the limits delineated in the appended claims.

What is claimed is:

1. In the non-destructive testing of test bodies for surface discontinuities, the step of applying over a surface thereof a flaw penetrating vehicle comprising a liquid penetrant selected from the class consisting of polyoxyalkylene glycols and aliphatic mono and diethers thereof, said penetrant having at least one dye dissolved therein.

2. In the non-destructive testing of test bodies for surface discontinuities, the step of applying over a surface thereof a liquid flaw penetrating vehicle comprising a penetrant selected from the class consisting of polyoxyalkylene glycols and aliphatic mono and diethers thereof, a compatible liquid dilutent for said penetrant, and at least one dye dissolved in said penetrant.

3. In the non-destructive testing of test bodies for surface discontinuities, the step of applying over a surface thereof a liquid flaw penetrating vehicle comprising a penetrant selected from the class consisting of polyoxyalkylene glycols and aliphatic mono and diethers thereof, and having at least one fluoragent dissolved therein.

4. In the non-destructive testing of test bodies for surface discontinuities, the step of applying over a surface thereof a liquid flaw penetrating vehicle comprising a penetrant selected from the class consisting of water-immiscible polyoxyalkylene glycols and aliphatic mono and diethers thereof, a compatible, liquid, hydrocarbon dilutent for said penetrant and an emulsifying agent, and at least one dye dissolved in said penetrant.

5. In the non-destructive testing of test bodies for surface discontinuities, the step of applying over a surface thereof a liquid flaw-penetrating vehicle comprising a penetrant selected from the class consisting of liquid water-miscible polyoxyalkylene glycols and mono and diethers thereof, a compatible liquid dilutent for said penetrant, and a water-soluble dye dissolved in said penetrant.

6. A normally liquid testing agent composition suitable for use in detecting surface discontinuities in test bodies comprising a fluorescent dye dissolved in a flaw penetrating vehicle selected from the class consisting of liquid polyoxyalkylene glycols and aliphatic mono and diethers thereof.

7. A normally liquid testing agent composition suitable for use in detecting surface discontinuities in test bodies comprising a fluorescent dye dissolved in a flaw penetrating vehicle selected from the class consisting of liquid polyoxyalkylene glycols and aliphatic mono and diethers thereof, and an emulsifying agent.

8. A normally liquid testing agent composition suitable for use in detecting surface discontinuities in test bodies comprising a fluorescent dye dissolved in a flaw penetrating vehicle selected from the class consisting of liquid polyoxyalkylene glycols and aliphatic mono and diethers thereof, and a compatible diluent for the polyoxyalkylene component.

9. A normally liquid testing agent composition suitable for use in detecting surface discontinuities in test bodies comprising a fluorescent dye dissolved in a flaw penetrating vehicle selected from the class consisting of liquid polyoxyalkylene glycols and aliphatic mono and diethers thereof together with a water-immiscible diluent for the polyoxyalkylene component and an emulsifying agent.

10. A normally liquid testing agent composition suitable for use in detecting surface discontinuities in test bodies comprising at least one fluorescent dye dissolved in a liquid flaw-penetrating vehicle selected from the class consisting of liquid, oil-miscible, polyoxyalkylene glycols and aliphatic mono and diethers thereof, and a compatible, liquid, hydrocarbon diluent for said vehicle.

11. A normally liquid testing agent composition suitable for use in detecting surface discontinuities in test bodies comprising at least one fluorescent dye dissolved in a liquid flaw-penetrating vehicle selected from the class consisting of liquid, water-miscible, polyoxyalkylene glycols and aliphatic mono and diethers thereof, and a compatible, liquid, hydrocarbon diluent for said vehicle.

12. A normally liquid testing agent composition suitable for use in detecting surface discontinuities in test bodies comprising at least one fluorescent dye dissolved in a liquid flaw-penetrating vehicle predominantly comprising liquid, water-immiscible, monohydroxy 1,2-polyoxypropylene butyl monoethers.

13. A normally liquid testing agent composition suitable for use in detecting surface discontinuities in test bodies comprising at least one fluorescent dye dissolved in a liquid flaw-penetrating vehicle predominantly comprising liquid, monohydroxy polyoxyethylene-polyoxy 1,2-propylene butyl monoethers.

14. A normally liquid testing agent composition suitable for use in detecting surface discontinuities in test bodies comprising at least one fluorescent dye dissolved in a liquid flaw-penetrating vehicle predominantly comprising liquid, water-miscible, polyoxyalkylene glycols.

15. A normally liquid testing agent composition suitable for use in detecting surface discontinuities in test bodies comprising at least one fluorescent dye dissolved in a liquid flaw-penetraating vehicle predominantly comprising liquid, oil-miscible, polyoxyethylene-polyoxy 1,2-propylene diols having an average of at least three ethylene groups per propylene group in a molecule and having an average molecular weight of at least 300 attributable to oxyethylene and oxypropylene groups.

16. A normally liquid testing agent composition suitable for use in detecting surface discontinuities in test bodies comprising at least one fluorescent dye dissolved in a liquid flaw-penetrating vehicle predominantly comprising liquid diethers of polyoxyalkylene diols.

17. A normally liquid testing agent composition suitable for use in detecting surface discontinuities in test bodies comprising at least one fluorescent dye dissolved in a liquid flaw-penetrating vehicle predominantly comprising liquid, water-miscible diethers of polyoxyalkylene diols characterized by polyoxyalkylene chains containing both oxyethylene and oxy, 1,2-propylene groups therein in the ratio of at least three to one.

18. A normally liquid testing agent composition suitable for use in detecting surface discontinuities in test bodies comprising at least one fluorescent dye dissolved in a liquid flaw-penetrating vehicle predominantly comprising liquid, water-miscible diethers of polyoxyalkylene diols characterized by polyoxyalkylene chains containing both oxyethylene and oxy 1,2-propylene groups therein in the ratio of at least three to one and having a molecular weight of at least 500 attributable to said groups.

19. A normally liquid testing agent composition suitable for use in detecting surface discontinuities in test bodies comprising a dye dissolved in a flaw-penetrating dye solvent selected from the class consisting of liquid polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups.

20. A normally liquid testing agent composition suitable for use in detecting surface discontinuities in test bodies comprising a dye dissolved in a flaw-penetrating dye solvent selected from the class consisting of liquid polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups, and an emulsifying agent.

21. A normally liquid testing agent composition suitable for use in detecting surface discontinuities in test bodies comprising a dye dissolved in a flaw-penetrating dye solvent selected from the class consisting of liquid polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups, a compatible liquid diluent for said dye solvent, and an emulsifying agent rendering said composition self-dispersible in water.

22. A normally liquid testing agent composition suitable for use in detecting surface discontinuities in test bodies comprising a dye dissolved in a flaw-penetrating dye solvent selected from the class consisting of liquid, water-miscible, polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups.

23. A normally liquid testing agent composition suitable for use in detecting surface discontinuities in test bodies comprising a water-soluble dye dissolved in a flaw-penetrating dye solvent selected from the class consisting of liquid, water-miscible, polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups.

24. A normally liquid testing agent composition suitable for use in detecting surface discontinuities in test bodies comprising a water-soluble dye dissolved in a flaw-penetrating dye solvent selected from the class consisting of liquid, water-miscible, polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups, and a compatible water-miscible diluent for said dye solvent.

25. A normally liquid testing agent composition suitable for use in detecting surface discontinuities in test bodies comprising a dye dissolved in a flaw-penetrating dye solvent selected from the class consisting of liquid, water-immiscible, polyoxy, 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups.

26. A normally liquid testing agent composition suitable for use in detecting surface discontinuities in test bodies comprising a dye dissolved in a flaw-penetrating dye solvent selected from the class consisting of liquid, water-immiscible, polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups, and a compatible liquid hydrocarbon dilutent for said dye solvent.

27. A normally liquid testing agent composition suitable for use in detecting surface discontinuities in test bodies comprising a dye dissolved in a flaw-penetrating dye solvent selected from the class consisting of liquid, water-immiscible, polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups, and an emulsifying agent rendering said composition self-dispersible in water.

28. A normally liquid testing agent composition suitable for use in detecting surface discontinuities in test bodies comprising a dye dissolved in a flaw-penetrating dye solvent selected from the class consisting of liquid, water-immiscible, polyoxy 1,2-propylene glycols, polyoxyethylene-polyoxy 1,2-propylene glycols, and aliphatic mono and diethers of said glycols, the members of said class having an average molecular weight of at least 300 attributable to oxyalkylene groups exclusive of the glycol etherifying groups, a compatible liquid hydrocarbon dilutent for said dye solvent, and an emulsifying agent rendering said composition self-dispersible in water.

References Cited in the file of this patent

UNITED STATES PATENTS

| | | |
|---|---|---|
| 2,340,940 | DeForest | Feb. 8, 1944 |
| 2,582,868 | Hausmann et al. | Jan. 15, 1952 |
| 2,623,827 | Moos | Dec. 30, 1952 |

OTHER REFERENCES

"Carbowax," Carbide and Carbon Corp. 16 page pamphlet, page 3, 1946.

"Ucon" Carbide and Carbon Corp. 20 page pamphlet, p. 17, 1947.

Atlas Surface Active Agents, publication by Atlas Powder Company of Wilm., Del., 1949, pp. 26 to 29, including Tables I and II on page 26A.